United States Patent [19]
Gordon

[11] Patent Number: 6,157,708
[45] Date of Patent: Dec. 5, 2000

[54] INTERACTIVE SUBSCRIBER TELEPHONE TERMINAL WITH AUTOMATIC MANAGEMENT SOFTWARE DOWNLOAD FEATURE

[75] Inventor: Ian R. Gordon, Ottawa, Canada

[73] Assignee: Nortel Networks Limited, Montreal, Canada

[21] Appl. No.: 09/334,184

[22] Filed: Jun. 16, 1999

Related U.S. Application Data

[62] Division of application No. 08/743,897, Nov. 6, 1996, Pat. No. 5,937,347.

[51] Int. Cl.[7] .................................................. H04M 3/42
[52] U.S. Cl. ..................... 379/207; 379/201; 379/127; 379/142; 455/415; 455/31.2
[58] Field of Search .................................. 379/201, 207, 379/142, 127; 455/31.2, 566, 415, 5.1, 4.2

[56] References Cited

U.S. PATENT DOCUMENTS

| | | | |
|---|---|---|---|
| 5,541,986 | 7/1996 | Hou | 379/201 |
| 5,581,599 | 12/1996 | Tsuji et al. | 455/415 |
| 5,615,257 | 3/1997 | Pezzullo et al. | 379/396 |
| 5,737,400 | 4/1998 | Bagchi et al. | 379/142 |
| 5,761,485 | 6/1998 | Munyan | 345/350 |
| 5,822,415 | 10/1998 | Gordon | 379/140 |
| 5,850,433 | 12/1998 | Rondeau | 379/201 |
| 5,864,604 | 1/1999 | Moen et al. | 379/112 |
| 5,937,347 | 8/1999 | Gordon | 455/415 |

FOREIGN PATENT DOCUMENTS

| | | |
|---|---|---|
| 2135350 | 5/1996 | Canada . |
| 841792 | 5/1996 | European Pat. Off. . |
| 10224499 | 8/1998 | Japan . |
| 94/30000 | 12/1994 | WIPO . |

*Primary Examiner*—Henry C. Yuen
*Assistant Examiner*—Hieu T. Vo

[57] ABSTRACT

Interactive subscriber telephone terminals have a display screen and softkeys which are controlled by management software. The management software may be downloaded from a remote server to control the display and softkeys. Different techniques for achieving this download are described. In one case each subscriber terminal has a memory in which can be preloaded a list of one or more Calling Line ID numbers corresponding to the telephone number of a server(s). If a server dials the subscriber terminal the calling line ID is compared with the list and, if there is a match, the terminal immediately goes off-hook and follows the protocol for a Server Initiated Download. In an alternative case each subscriber terminal is capable of calling out to predetermined server lines to obtain the ADSI scripts. This dial out of stored telephone numbers may be done on an automatic timed basis or may be initiated by a server calling a pager embedded in the subscriber terminal.

13 Claims, 5 Drawing Sheets

INTERACTIVE SUBSCRIBER TELEPHONE TERMINAL WITH AUTOMATIC MANAGEMENT SOFTWARE DOWNLOAD FEATURE

This application is a divisional of Application Serial No. 08/743,897 filed Nov. 6, 1996, now U.S. Pat. No. 5,937,347 issued Aug. 10, 1999.

FIELD OF THE INVENTION

This invention relates to telephone subscriber terminals of the type having a display screen and softkeys which are controlled by management software generated by a remote server.

BACKGROUND OF THE INVENTION

In December, 1992 an industry-wide standard protocol for Analog Display Services Interface (ADSI) was completed by Bell Communications Research Inc. (Bellcore specifications) to serve as a standard for voice and display (data) information to be transmitted between subscriber display-based terminals and telecommunications switches or servers over the existing copper telephone lines. This standard protocol also defines the formats for the large scrollable displays and softkeys to support new enhanced, interactive, services.

Typical of the interactive subscriber terminals (telephone sets) designed to support the ADSI protocol is the one described in U.S. patent application Ser. No. 354,599 filed on Dec. 13, 1994 in the name of William V. Pezzullo et al and entitled "Screen-Based Telephone Set For Interactive Enhanced Telephony Service" now U.S. Pat. No. 5,615,257. This patent is incorporated herein by reference.

The subscriber terminal described in the pending application has a relatively large scrollable display and context-sensitive softkeys which enable the terminal to make full use of services typically provided by telephone operating companies, as well as those services provided by enhanced service providers (ESP) delivering third party services and applications through the PSTN (public switched telephone network).

Enhanced service providers (ESPs) are the second major source of ADSI-based services. ESP applications are driven by information downloaded to the terminal from a server— for example, an interactive voice-responsive system located in a bank.

The terminal supports the ADSI protocol which includes the concept of FDM (feature download management) software scripts which can control the display and the softkeys and cause the terminal to go on-hook, off-hook and dial numbers. The terminal also supports an extension to the Bellcore specifications which allows a server to download an FDM script without any intervention by the subscriber. This capability, called Server Initiated Download or ADSI On-Hook Alerting for Automatic Feature Download, requires access to the Tip and Ring of the telephone line connected to the target subscriber terminal while the terminal is on-hook. The downloading of the FDM script is carried out unobtrusively—i.e., without ringing the telephone. This Server Initiated Download capability is not universally available on all types of Central Office Switching equipment and requires specialized connections from the FDM download server to the Central Office Switching equipment.

SUMMARY OF THE INVENTION

It is an object of the present invention to provide a subscriber terminal which enables Server Initiated Download of management software such as FDM scripts even when the Central Office switching equipment is not adapted to handle it.

According to one aspect of the invention the subscriber terminal has a memory in which can be preloaded a list of one or more Calling Line ID numbers corresponding to the telephone number of a server(s). If a server dials the subscriber terminal the calling line ID is compared with the list and, if there is a match, the terminal immediately goes off-hook and follows the protocol for a Server Initiated Download.

The essential difference between this technique and the one currently specified by Bellcore is that the terminal goes off-hook in response to a standard Calling Line ID message sent from the Central Office Switching equipment, rather than a specialized message sent from the Feature Download server through the Central Office Switching equipment via a specialized connection.

This allows a Service Provider to avoid having to pay charges for access to an on-hook telephone line for each terminal that it wishes to download to.

This aspect of the invention is particularly but not exclusively targeted at those countries that support Calling Line ID transmission before the first power ringing burst is sent to the terminal. These include the United Kingdom and Australia at this time.

In an alternative aspect of the invention the subscriber terminal is capable of calling out to predetermined server lines to obtain the ADSI scripts. This dial out of stored telephone numbers may be done on an automatic timed basis or may be initiated by a server calling a pager network which sends a numeric page to a pager embedded in the subscriber terminal. This aspect can be used irrespective of whether the country supports Calling Line ID transmission before the first power ringing burst is sent to the subscriber terminal.

DETAILED DESCRIPTION OF PREFERRED EMBODIMENTS

Figure 1:
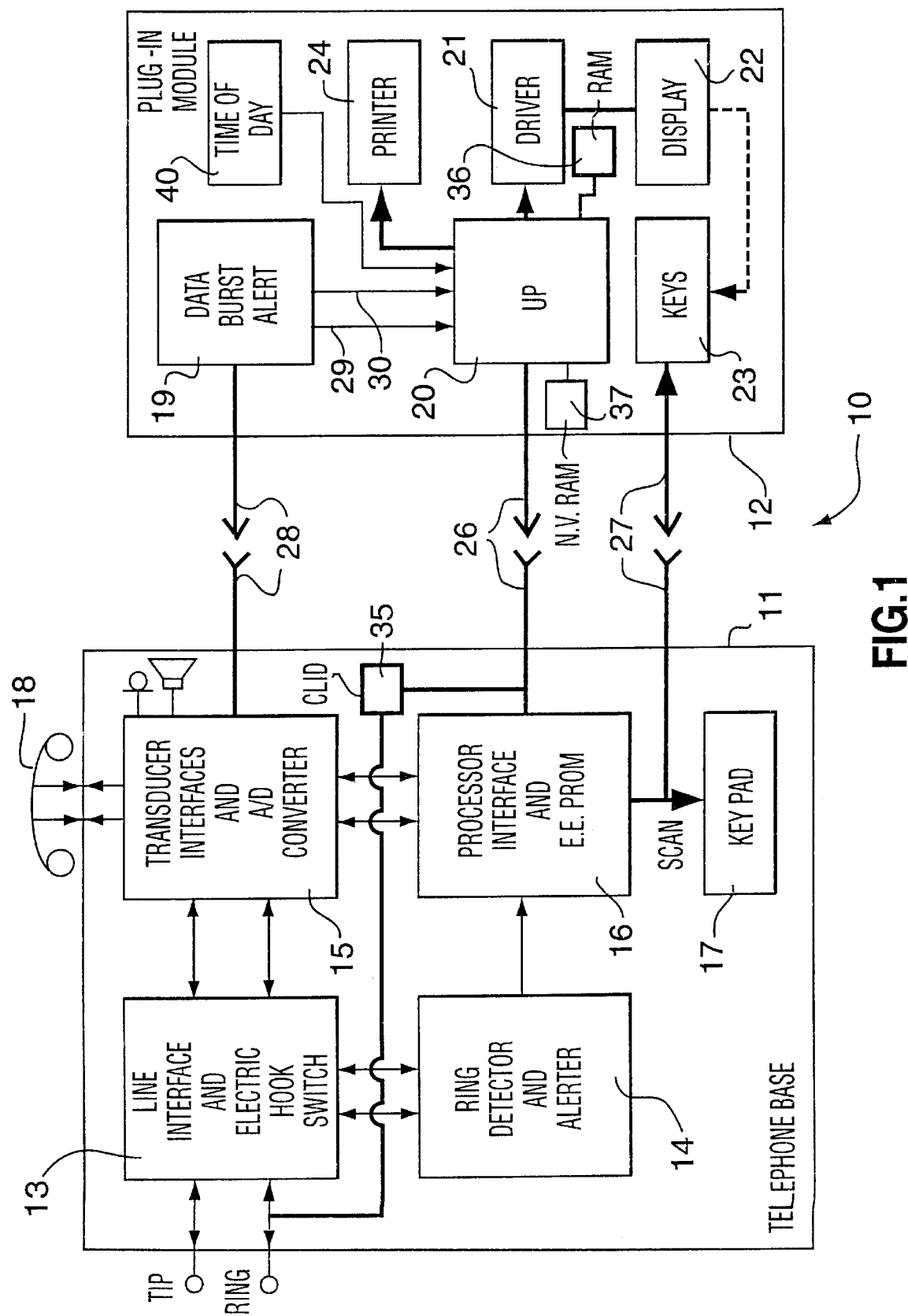
FIG. 1 is a block schematic of an ADSI subscriber terminal according to the present invention.

FIG. 1 of the drawings shows a block schematic of Analog Display Services Interface (ADSI) subscriber terminal 10, which comprises telephone (or terminal) base 11 and plug-in module 12. The base 11 connects to the TIP and RING of the telephone line connecting it to the central office (CO) of the telephone company. The base 11 comprises a line interface and electronic hook switch circuits 13, ring detector and alerter circuits 14, transducer interface and analog-to-digital (A/D) converter circuits 15, processor interface and EEPROM circuits 16, and standard touch-tone telephone keypad 17. A handset 18 is, of course, part of the standard telephone components of the base 11. The ADSI plug-in module 12 comprises a data burst alert circuit 19, a microprocessor 20, an LCD display driver 21, an LCD display 22, softkeys (redefinable keys) 23 adjacent the display 22, and a printer (or printer port for an external printer) 24. Normally, the keys 23 will also include hard-keys such as scrolling cursor keys 25 and so on (as shown in FIG. 2).

Figure 2:
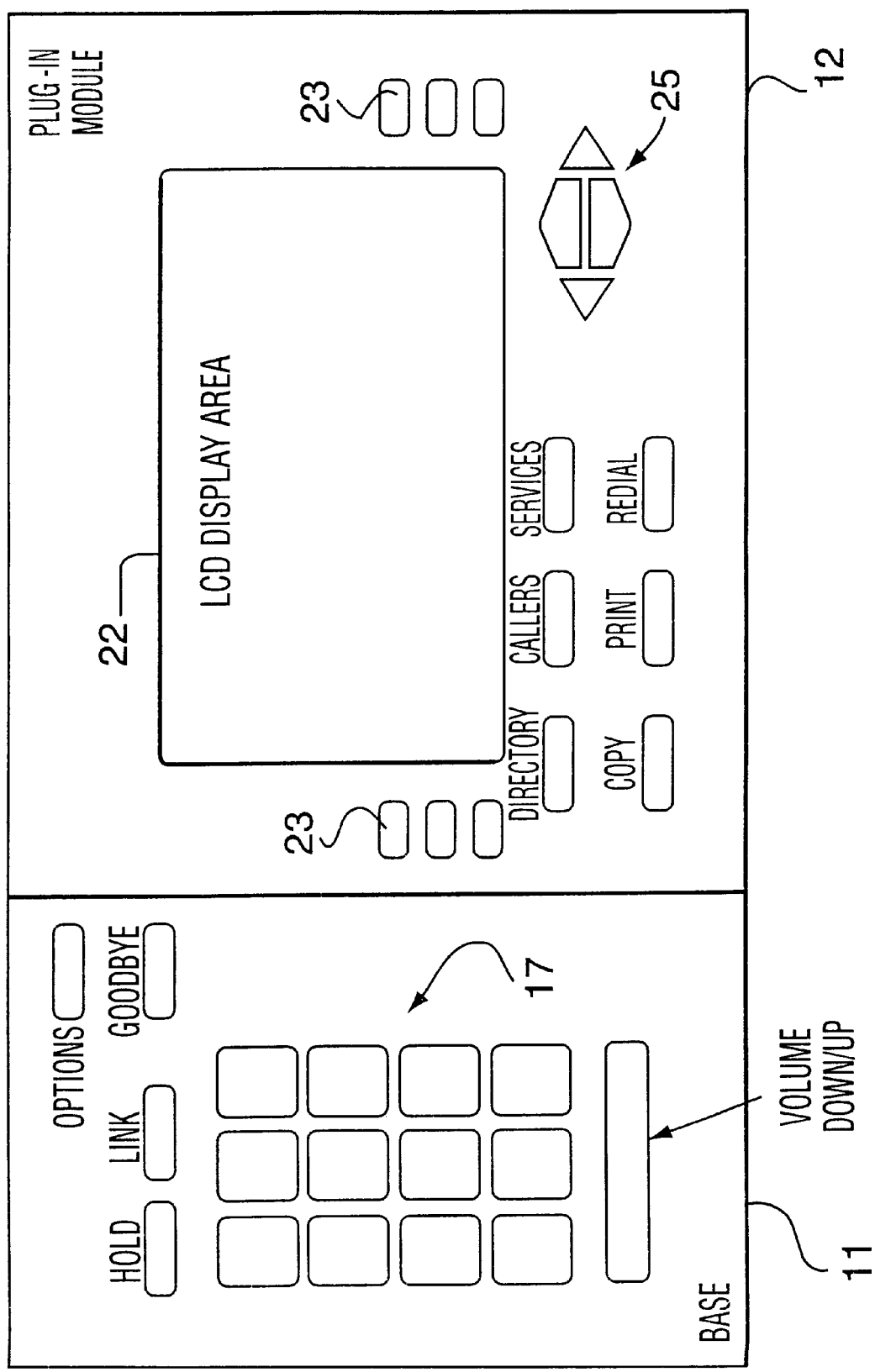
FIG. 2 is a pictorial drawing depicting the front of the subscriber terminal as accessed by a user.

Referring also to FIG. 2, which shows the user-visible front of the ADSI terminal 10, the module 12 plugs into the base 11 and connects to the latter by means of two buses 26 and 27, the former being the processor bus, and the latter for scanning the keys 23. The data burst alert 19, which comprises two switched-capacitor filters for detecting two pre-burst tones, receives signals through the interface 15 via connection 28. The sole function of the alert circuit 19 is to tell the processor 20 by means of high-tone and low-tone leads 29 and 30 that a data burst will follow.

A calling line identifier device (CLID) 35 is also provided in base 11 and a static RAM 36 and a non-volatile random access memory (NVRAM) 37 are provided in module 12 and connected to microprocessor 20. The NVRAM 37 is preloaded with the calling line ID numbers of one or more servers. The preloading of the calling line ID numbers could be carried out by preprogramming in the factory when the terminal 10 is being manufactured. Alternatively, the terminal could be provided with any appropriate means for allowing the subscriber to enter a preselected list in a manner similar to selecting entries in a directory. Probably the preferred method of preloading involves adding/deleting or changing entries in the list by sending an appropriate command from the remote server over the PSTN. Each number would be required to be 12 bytes in length, each nibble of which represents a single digit of the Calling Line ID number, for a maximum number length of 24 digits. For maximum flexibility the table should be able to contain 16 numbers. This would require 12*16=192 bytes of non-volatile memory in the terminal.

The software running the microprocessor 20 includes instructions to compare the calling line ID with the numbers in NVRAM 37 and, if there is a match, go off-hook (i.e., connect the subscriber terminal to the server) and follow the protocol for a Server Initiated Download.

In countries such as the United Kingdom and Australia when a telephone number is dialled calling line ID information is transmitted before the first power ringing burst. Thus, when the terminal of this invention is used in one of those countries calling line ID is obtained in the CLID 35 immediately and this is compared in microprocessor 20 with the numbers preloaded in NVRAM 37. If there is a match, the microprocessor 20 causes electronic hook switch circuits 13 to go off hook and causes the Server Initiated Download protocol to be followed using the Suppressed Ring Access standard. This means that connection is established without the subscriber terminal 10 ringing. In this way download is achieved unobtrusively.

When connection is thus established between the server and the subscriber terminal, ADSI information (such as application and softkey definition data) is transmitted to the terminal at a rate of 1200 baud using the same type of signal that provided the calling line ID. The ADSI information can be transmitted as in-band signalling by previously transmitting two tones, 2130 Hz and 2750 Hz, simultaneously for 80 msecs which the data burst alert 19 recognizes as preceding a burst of ADSI information. Thus, the voice paths are muted during data reception to ensure that data is not corrupted and that the user will not hear the data being transmitted. The two frequencies chosen can be isolated from voice because they are not among those generated by the dialpad and also do not occur frequently in conversation.

These ADSI signals pass through the Line Interface and Electronic Hookswitch 13, through the Transducer Interfaces and A/D Converter 15 where they are sampled and converted to digital signals by the A/D converter, through the Processor Interface and EEPROM 16 which further processes the digital samples and then to the microprocessor 20 which is running S/W code contained in built-in masked ROM. The microprocessor 20 decodes the command and takes appropriate action on the RAM 36 contained within the microprocessor block 20. Information to be sent back to the server originates from the microprocessor 20, is sent to the processor interface and EEPROM 16 and is then converted into DTMF (dual tone multi frequency) digits which are converted to analog waveforms by a D/A converter (not shown) in Processor Interface block 16 which are then applied by the Transducer interfaces to Tip and Ring through the Line Interface and Electronic Hookswitch 13.

Figure 3:
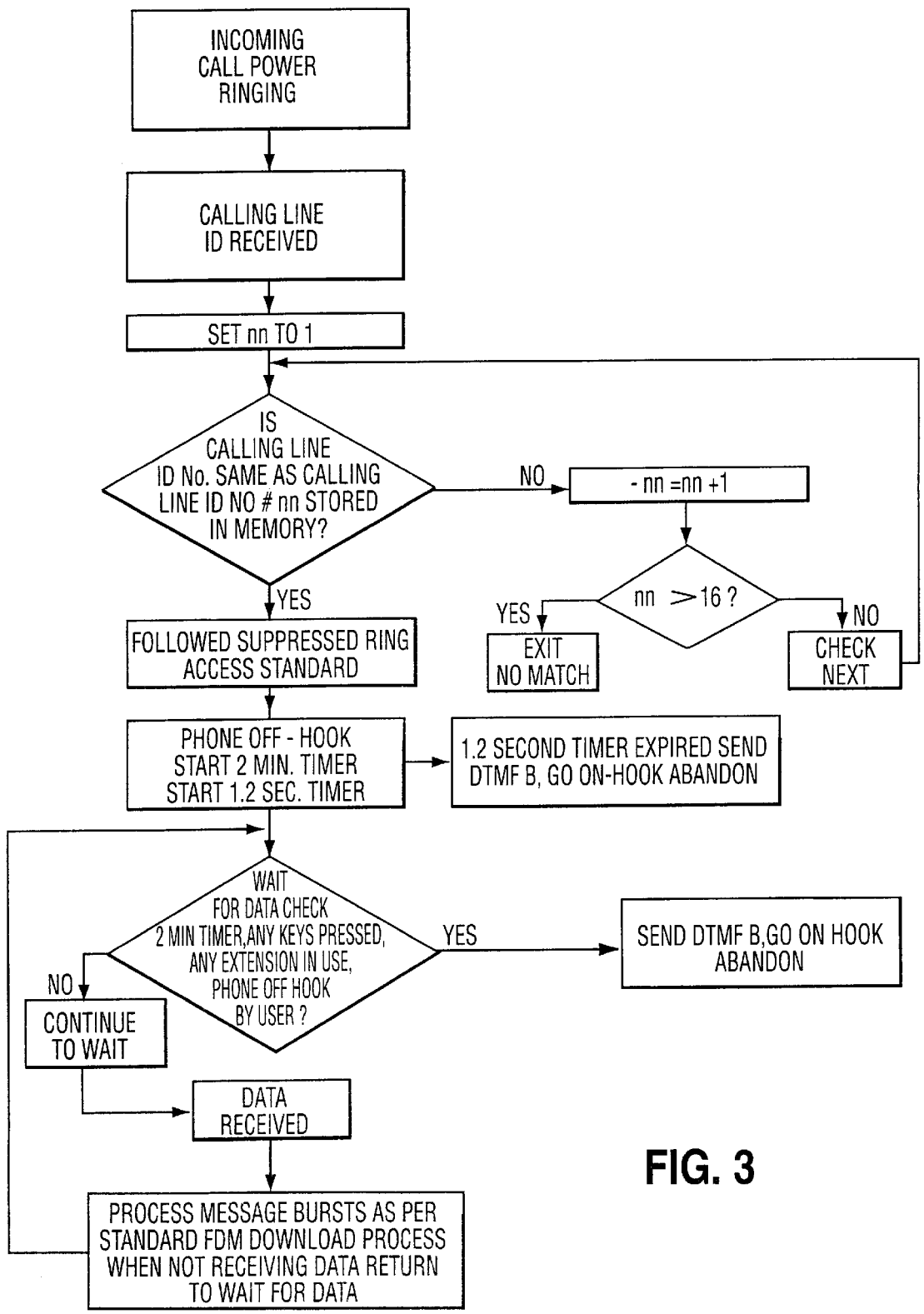
FIG. 3 is a flowchart illustrating the calling line ID match technique.

The method outlined above is illustrated in the flowchart of FIG. 3. More particularly it can be seen that two timers are started immediately when the terminal 10 goes off-hook. The first is a 1.2 second timer and the second is a 2 minute timer. Normally data would be received by the terminal 10 within 1.2 seconds and if data is not received by this time the terminal sends a DTMF B to the remote server and then goes on-hook thereby abandoning the FDM download.

It is imperative that the line be released from the FDM download process when the subscriber indicates he wants to use the terminal 10 by pressing any key or taking the phone off-hook or by using an extension. It may take up to 2 minutes for the entire process and during that time the system constantly monitors whether the terminal is in use and if so abandonment is instructed by sending the DTMF B and going on-hook.

For remote programming of the list in the NVRAM 37 one new command is required to be added to the ADSI protocol to support the invention:

SDC (Server Display Control) Parameter Type= Download CLID=155 decimal, 99 hexadecimal for example or any other appropriate single byte number assigned by Bellcore so as to uniquely identify this command Parameter Length=Number of bytes following=2 minimum, 13 maximum List Number=1 Byte=Item Number in List=00 to OF hexadecimal CLID Number=0 to 12 bytes with F or FF as the terminator—if send all 12 bytes (representing a 24 digit number) then no terminator required. If only a delimiter of FF is sent then the list entry will be cleared. The Number is packed such that each nibble represents a single digit of the number. Valid numbers are from 0 to 9 - * and # cannot be specified as part of a CLID number.

When this command is received the CLID Number is loaded into the table location specified by the List number. This command is also used to clear out the table location specified by List Number by sending no data in the CLID Number field and only sending a delimiter.

Note that this command needs to be supported during an SDC session, and during a Server Initiated Download so that calling line ID numbers can be altered without any user intervention.

As described hereinbefore, in countries such as the United Kingdom and Australia calling line ID transmission is carried out before the first power ringing burst is sent to the terminal. In North America the Calling Line ID is delivered between the first and second power ringing bursts as defined by Bellcore. Accordingly, using the invention the CLID match is made after the CLID has been delivered, i.e., between the first and second power ringing bursts. Thus, if the invention were applied in North America the telephone would ring at the start of an FDM download. This could be used to signal to the subscriber that an URGENT or EMERGENCY message has been transmitted to the display of his terminal. In the United Kingdom and Australia, if it were desired to achieve a ringing to indicate such a message this could be done by generating locally in the terminal a ringing sound.

As an alternative to commencing FDM download when a CLID match is made the sixteen numbers stored in the NVRAM could be dialled out to attempt to connect to the remote servers either on an automatic timed basis or when paged by a specific number.

Figure 4:
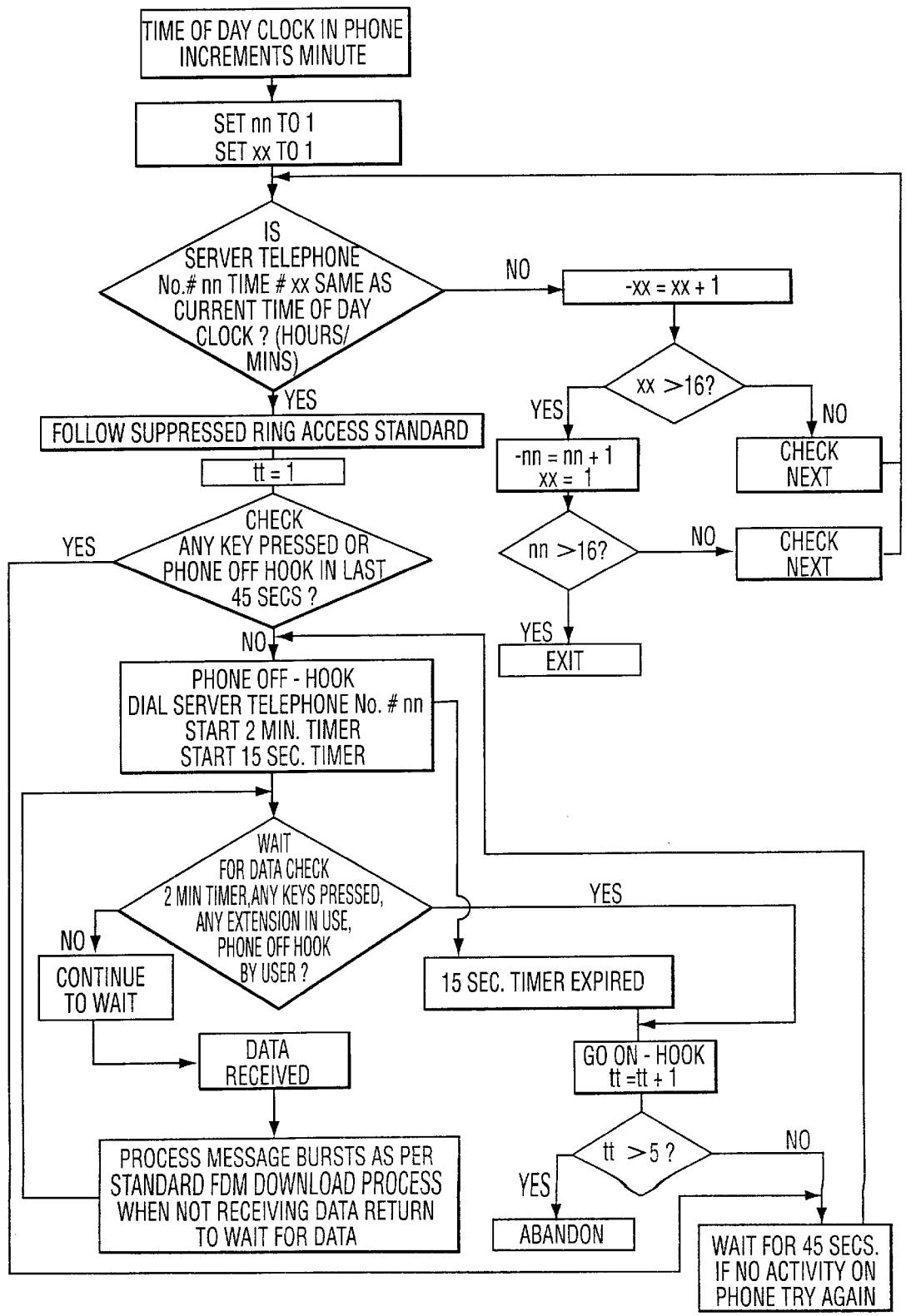
FIG. 4 is a flowchart illustrating the automatic dial out technique.

FIG. 4 is a flowchart illustrating the first of these alternatives. As in the first embodiment the NVRAM 37 stores 16 preprogrammed numbers. These strictly should be referred to as telephone numbers rather than calling line ID numbers as they are numbers to be dialled out. The NVRAM 37 also stores against each number times of day that the respective number is to be dialled out.

A time of day clock 40 in the terminal 10 (see FIG. 1) increments in minutes. At each minute the times of day stored in the NVRAM 37 are compared with the real time of day provided by clock 40 and if there is a match the telephone goes off-hook and the telephone number corresponding to the matched time of day is dialled. The phone would only dial out to the number if the telephone line was idle (not being used by the telephone or any extension) and there had not been any key presses on the phone within the last 45 seconds. If there had been any activity or if the phone line was in use the phone would wait until the line was not busy and there had not been any key presses for the last 45 seconds and then dial out to the server.

At the same time a 15 second timer and a 2 minute timer are started. If at any time during the timed 2 minutes any key is pressed, any extension is used or the telephone is taken off-hook or if the 15 second timer expires the call is aborted. (15 seconds should be sufficient time for a call to be connected and data received). Call abort is indicated in the flowchart by "Go on-hook". The same number is redialled after a delay of 45 seconds during which there is no activity on the telephone. This can be repeated up to a maximum of five attempts and if still data is not received the call to that number is abandoned.

Figure 5:
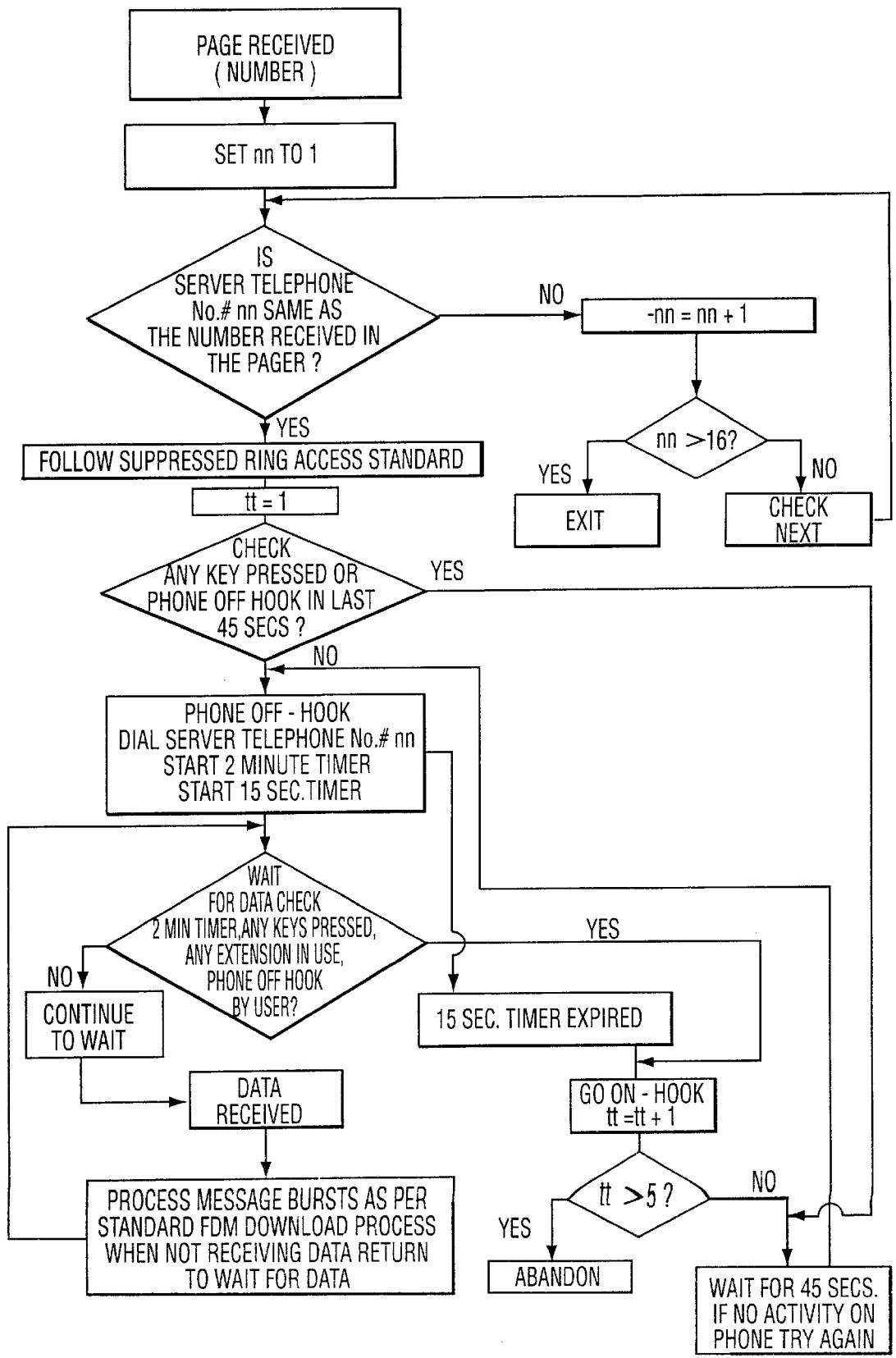
FIG. 5 is a flowchart illustrating the pager dial out technique.

FIG. 5 is a flowchart illustrating the second alternative, i.e., a dial out process using a pager in the terminal 10. Again, the NVRAM 37 stores 16 preprogrammed telephone numbers. However there is no time of day data stored with the numbers as in the FIG. 4 embodiment. Instead a pager is embedded in the terminal such that, when a server calls the paging service and enters the telephone number of the server, that number is radio transmitted by the paging service and received in the pager where it is compared in turn with the numbers stored in the NVRAM 37 and if there is a match the same number is dialled out. The remainder of the process is exactly the same as for the embodiment illustrated in FIG. 4.

It should be noted that the dial out embodiments described with reference to FIGS. 4 and 5, whether used in North America or elsewhere, are unobtrusive to the subscriber terminal 10 as the terminal 10 dials out to the server. If it were desired to signal the arrival of an EMERGENCY or URGENT message a locally generated ring could be manufactured.

What is claimed is:

1. An interactive subscriber telephone terminal, comprising:

a display screen, a plurality of temporarily definable response/data entry keys; and local control means for selectively causing said display screen or said response/data entry keys to be controlled by one of: remote signals transmitted to the terminal from a telephone switching office, and said local control means, the terminal further comprising:

means for selectively storing one or more telephone numbers of one or more remote servers, respectively; and means for automatically dialling out from the terminal at predetermined times the one or more stored telephone numbers whereby download of management software to the terminal from a remote server is achieved.

2. A terminal according to claim 1 in which the means for selectively storing one or more telephone numbers is a NVRAM which also stores the predetermined times associated with each telephone number.

3. A terminal according to claim 2 in which the NVRAM is programmable by a command from a remote server to add, delete or change the one or more telephone numbers and associated predetermined times stored in the NVRAM.

4. A terminal according to claim 2 in which the NVRAM has been factory preprogrammed with the one or more telephone numbers and associated predetermined times stored therein.

5. A terminal according to claim 2 in which the NVRAM is programmable at the terminal by a subscriber to add, delete or change the one or more telephone numbers and associated predetermined times stored in the NVRAM.

6. An interactive subscriber telephone terminal, comprising:

a display screen, a plurality of temporarily definable response/data entry keys; and local control means for selectively causing said display screen or said response/data entry keys to be controlled by one of: remote signals transmitted to the terminal from a telephone switching office, and said local control means, the terminal further comprising:

a pager means for receiving from a paging service radio messages each including a telephone number entered by a calling party via the telephone switching office; and means for comparing each received telephone number with the stored one or more telephone numbers; and means for dialling out from the terminal one of the one or more stored telephone numbers when a match is made with a received telephone number whereby download of management software to the terminal from a remote server is achieved.

7. A terminal according to claim 6 in which the means for selectively storing one or more telephone numbers is a NVRAM.

8. A terminal according to claim 7 in which the NVRAM is programmable by a command from a remote server to add, delete or change the one or more telephone numbers stored in the NVRAM.

9. A terminal according to claim 7 in which the NVRAM has been factory preprogrammed with the one or more telephone numbers stored therein.

10. A terminal according to claim 7 in which the NVRAM is programmable at the terminal by a subscriber to add, delete or change the one or more telephone numbers stored in the NVRAM.

11. A method of downloading management software from a remote server through a telephone network to an interactive subscriber telephone terminal which has a display screen, a plurality of temporary definable response/data entry keys and local control means, the method comprising:

the subscriber terminal dialling automatically the telephone number of the remote server at predetermines times; and downloading from the remote server the management software when connection between the remote server and the subscriber telephone terminal is established.

12. A method according to claim 11, wherein the subscriber telephone terminal stores a plurality of remote server telephone numbers and associated predetermined times and the subscriber telephone terminal dials automatically all of the server telephone numbers at the associated predetermined times whereby each remote server downloads management software when connection between that remote server and the subscriber telephone terminal is established.

13. A method of downloading management software from a remote server through a telephone network to an interactive subscriber telephone terminal which has a display screen, a plurality of temporary definable response/data entry keys and local control means, the method comprising:

the server dialling a telephone number of a paging service of the subscriber and entering the server telephone number;

the paging service transmitting by radio the server telephone number which is received in a pager embedded in the subscriber telephone terminal; and comparing the received telephone number with one or more telephone numbers stored in the subscriber telephone terminal;

if a match between the received telephone number and the one or more telephone numbers is made causing the subscriber terminal to dial out the matched telephone number; and downloading from the remote server the management software when connection between the remote server and the subscriber terminal is established.

* * * * *